United States Patent
Chae et al.

(10) Patent No.: US 9,712,283 B2
(45) Date of Patent: Jul. 18, 2017

(54) METHOD AND APPARATUS FOR DATA TRANSMISSION OF DEVICE-TO-DEVICE USER EQUIPMENT IN WIRELESS COMMUNICATION SYSTEM

(71) Applicant: LG ELECTRONICS INC., Seoul (KR)

(72) Inventors: Hyukjin Chae, Seoul (KR); Hanbyul Seo, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 40 days.

(21) Appl. No.: 14/835,393

(22) Filed: Aug. 25, 2015

(65) Prior Publication Data

US 2016/0066317 A1    Mar. 3, 2016

Related U.S. Application Data

(60) Provisional application No. 62/042,228, filed on Aug. 26, 2014, provisional application No. 62/042,768, filed on Aug. 27, 2014.

(51) Int. Cl.
*H04W 72/04*   (2009.01)
*H04L 1/16*    (2006.01)
*H04J 1/02*    (2006.01)
*H04W 76/02*   (2009.01)
*H04L 5/00*    (2006.01)

(52) U.S. Cl.
CPC .............. *H04L 1/1614* (2013.01); *H04J 1/02* (2013.01); *H04L 5/0033* (2013.01);
(Continued)

(58) Field of Classification Search
None
See application file for complete search history.

(56) References Cited

U.S. PATENT DOCUMENTS

2013/0148566 A1    6/2013   Doppler et al.
2014/0369292 A1*  12/2014   Wu ....................... H04W 72/04
                                                            370/329

(Continued)

FOREIGN PATENT DOCUMENTS

WO    2013143440    10/2013

OTHER PUBLICATIONS

Samsung et al., "WF on T-RPT Design," 3GPP TSG-RAN WG1 #78, R1-143450, Aug. 2014, 6 pages.

(Continued)

*Primary Examiner* — Kodzovi Acolatse
(74) *Attorney, Agent, or Firm* — Lee Hong Degerman Kang Waimey

(57) ABSTRACT

According to an embodiment of the present invention, a method for transmitting Device-to-Device (D2D) data by a User Equipment (UE) in a wireless communication system, the method comprising: determining a bitmap to be applied to a subframe pool for data transmission from a subframe indicator bitmap; determining a set of subframes to transmit D2D data by using the bitmap to the subframe pool for data transmission; and transmitting D2D data in a subframe included in the determined subframe set, wherein a set of values available as k being the number of 1s in the subframe indicator bitmap are changed according to a Uplink/Downlink (UL/DL) configuration set to which a UL/DL configuration configured for the UE belongs.

12 Claims, 6 Drawing Sheets

(52) U.S. Cl.
CPC ....... *H04W 72/0446* (2013.01); *H04L 5/0007* (2013.01); *H04L 5/0053* (2013.01); *H04W 76/023* (2013.01)

(56) References Cited

U.S. PATENT DOCUMENTS

| | | | |
|---|---|---|---|
| 2015/0055579 A1* | 2/2015 | Wu | H04L 1/1867 370/329 |
| 2015/0085719 A1* | 3/2015 | Yin | H04L 1/1896 370/280 |
| 2015/0264588 A1 | 9/2015 | Li et al. | |
| 2016/0021625 A1* | 1/2016 | Li | H04W 72/1289 370/336 |
| 2016/0044652 A1 | 2/2016 | Xue et al. | |

OTHER PUBLICATIONS

Nokia Networks, "T-RPT Pattern Design," 3GPP TSG-RAN WG1 #78, R1-143536, Aug. 2014, 4 pages.
Qualcomm Incorporated, "Status Report to TSG," 3GPP TSG-RAN WG1 #64, RP-140648, Jun. 2014, 25 pages.
PCT International Application No. PCT/KR2015/008919, Written Opinion of the International Searching Authority dated Dec. 3, 2015, 9 pages.
Nec, "D2D and cellular resource multiplexing," 3GPP TSG RAN WG1 Meeting #78, R1-143154, XP050788632, Aug. 2014, 4 pages.
Catt, et al., "WF on D2D resource pool bitmap length and repetition number for TDD," 3GPP Draft, R1-143649, XP050816003, Aug. 2014, 4 pages.
Samsung, "WF on T-RPT Design," 3GPP Draft, R1-143456, XP050788975, Aug. 2014, 6 pages.
Catt, "Email summary of [78-14] and remaining issues in [78-11]," 3GPP TSG RAN WG1 Meeting #78bis, R1-143739, XP050869425, Sep. 2014, 8 pages.
Intel Corporation, "Discussion on Time Resource Pattern of Transmission," 3GPP TSG RAN WG1 Meeting #80, R1-150235, XP050948905, Jan. 2015, 6 pages.
European Patent Office Application Serial No. 15002529.4, Search Report dated Jan. 15, 2016, 9 pages.
U.S. Appl. No. 14/835,362, Notice of Allowance dated Apr. 5, 2017, 10 pages.

* cited by examiner

FIG. 1
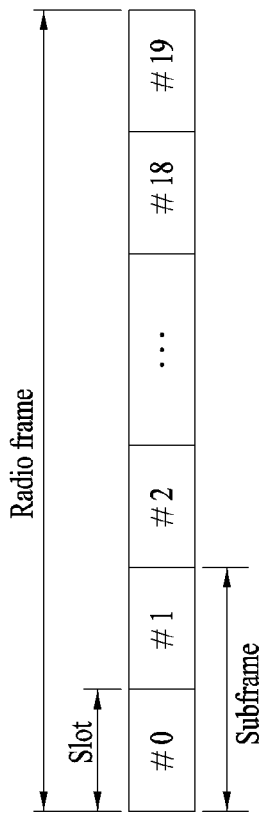
(a)
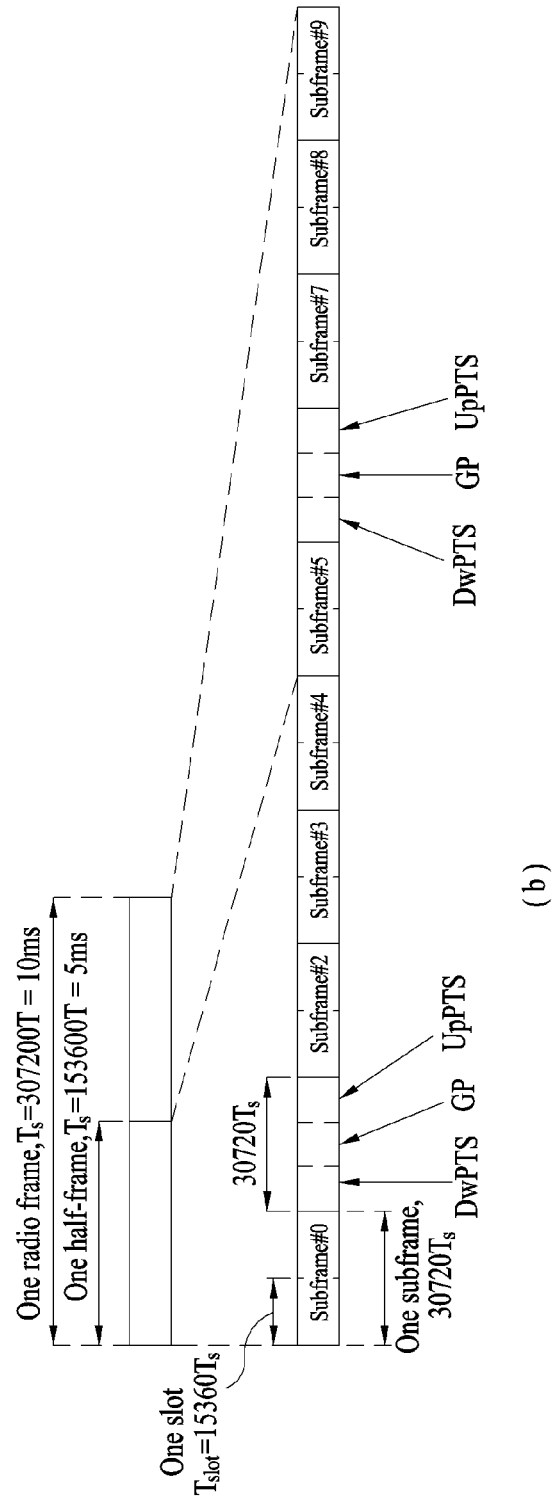
(b)

METHOD AND APPARATUS FOR DATA TRANSMISSION OF DEVICE-TO-DEVICE USER EQUIPMENT IN WIRELESS COMMUNICATION SYSTEM

CROSS-REFERENCE TO RELATED APPLICATIONS

Pursuant to 35 U.S.C. §119(e), this application claims the benefit of U.S. Provisional Patent Application No(s). 62/042,228, filed on Aug. 26, 2014 and 62/042,768, filed on Aug. 27, 2014, the contents of which are all hereby incorporated by reference herein in their entirety.

TECHNICAL FIELD

The present invention relates to a wireless communication system, and more particularly, to a method and apparatus for transmitting data in Device-to-Device (D2D) communication.

BACKGROUND ART

Wireless communication systems have been widely deployed to provide various types of communication services such as voice or data. In general, a wireless communication system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a Multi-Carrier Frequency Division Multiple Access (MC-FDMA) system.

D2D communication is a communication scheme in which a direct link is established between User Equipments (UEs) and the UEs exchange voice and data directly with each other without intervention of an evolved Node B (eNB). D2D communication may cover UE-to-UE communication and peer-to-peer communication. In addition, D2D communication may find its applications in Machine-to-Machine (M2M) communication and Machine Type Communication (MTC).

D2D communication is under consideration as a solution to the overhead of an eNB caused by rapidly increasing data traffic. For example, since devices exchange data directly with each other without intervention of an eNB by D2D communication, compared to legacy wireless communication, the overhead of a network may be reduced. Further, it is expected that with the introduction of D2D communication will reduce the power consumption of devices participating in D2D communication, increase data transmission rates, increase the accommodation capability of a network, distribute load, and extend cell coverage.

DISCLOSURE

Technical Problem

An object of the present invention is to define a set of values available as the number of 1s included in a subframe indicator bitmap.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

Technical Solution

A first technical aspect of the present invention is a method for transmitting Device-to-Device (D2D) data by a User Equipment (UE) in a wireless communication system, the method comprising: determining a bitmap to be applied to a subframe pool for data transmission from a subframe indicator bitmap; determining a set of subframes to transmit D2D data by using the bitmap to the subframe pool for data transmission; and transmitting D2D data in a subframe included in the determined subframe set, wherein a set of values available as k being the number of 1s in the subframe indicator bitmap are changed according to a Uplink/Downlink (UL/DL) configuration set to which a UL/DL configuration configured for the UE belongs.

A second technical aspect of the present invention is an apparatus of a User Equipment (UE) for transmitting a Device-to-Device (D2D) signal in a wireless communication system, the apparatus comprising: a transmission module; and a processor, wherein the processor is configured to determine a bitmap to be applied to a subframe pool for data transmission from a subframe indicator bitmap, to determine a set of subframes to transmit D2D data by using the bitmap to the subframe pool for data transmission, and to transmit D2D data in a subframe included in the determined subframe set, and wherein a set of values available as k being the number of 1s in the subframe indicator bitmap are changed according to a Uplink/Downlink (UL/DL) configuration set to which a UL/DL configuration configured for the UE belongs.

The UL/DL configuration configured for the UE is one of UL/DL configurations 1, 2, 4 and 5, the set of values available as k is $\{1, 2, 4, 8\}$.

The UL/DL configuration configured for the UE is UL/DL configuration 0, the set of values available as k is $\{1, 2, 3, 4, 5, 6, 7\}$.

If the UL/DL configuration configured for the UE is one of UL/DL configurations 3 and 6, the set of values available as k is $\{1, 2, 3, 4, 5, 6\}$.

The D2D data transmission is for transmission mode 1.

If the set of values available as k is $\{1, 2, 4, 8\}$, $\{1, 2, 3, 4, 5, 6, 7\}$, or $\{1, 2, 3, 4, 5, 6\}$, the size of the subframe indicator bitmap is 8, 7, or 6, respectively.

Advantageous Effects

According to at least one embodiment of present invention, delay when using time resource pattern and half duplex problem are solved.

The effects of the present invention are not limited to the above-described effects and other effects which are not described herein will become apparent to those skilled in the art from the following description.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 1 illustrates a radio frame structure;

BEST MODE

Figure 2:
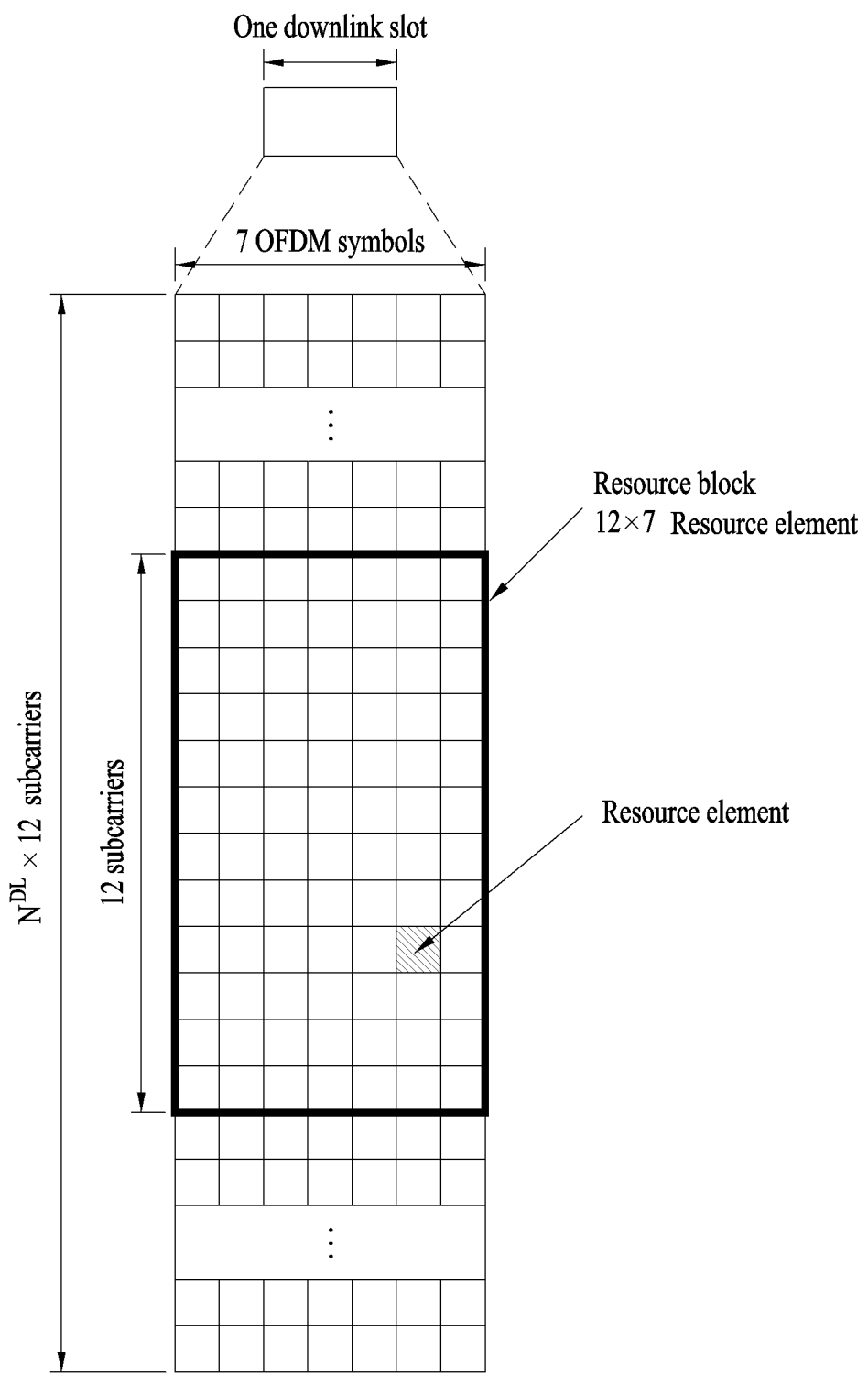
FIG. 2 illustrates a structure of a downlink resource grid for the duration of one downlink slot.

The embodiments described below are constructed by combining elements and features of the present invention in a predetermined form. The elements or features may be considered selective unless explicitly mentioned otherwise. Each of the elements or features can be implemented without being combined with other elements. In addition, some elements and/or features may be combined to configure an embodiment of the present invention. The sequence of the operations discussed in the embodiments of the present invention may be changed. Some elements or features of one embodiment may also be included in another embodiment, or may be replaced by corresponding elements or features of another embodiment.

Embodiments of the present invention will be described, focusing on a data communication relationship between a base station and a terminal. The base station serves as a terminal node of a network over which the base station directly communicates with the terminal Specific operations illustrated as being conducted by the base station in this specification may also be conducted by an upper node of the base station, as necessary.

In other words, it will be obvious that various operations allowing for communication with the terminal in a network composed of several network nodes including the base station can be conducted by the base station or network nodes other than the base station. The term "base station (BS)" may be replaced with terms such as "fixed station," "Node-B," "eNode-B (eNB)," and "access point". The term "relay" may be replaced with such terms as "relay node (RN)" and "relay station (RS)". The term "terminal" may also be replaced with such terms as "user equipment (UE)," "a mobile station (MS)," "mobile subscriber station (MSS)" and "subscriber station (SS)".

It should be noted that specific terms disclosed in the present invention are proposed for convenience of description and better understanding of the present invention, and these specific terms may be changed to other formats within the technical scope or spirit of the present invention.

In some cases, known structures and devices may be omitted or block diagrams illustrating only key functions of the structures and devices may be provided, so as not to obscure the concept of the present invention. The same reference numbers will be used throughout this specification to refer to the same or like parts.

Exemplary embodiments of the present invention are supported by standard documents disclosed for at least one of wireless access systems including an institute of electrical and electronics engineers (IEEE) 802 system, a 3rd generation partnership project (3GPP) system, a 3GPP long term evolution (LTE) system, an LTE-advanced (LTE-A) system, and a 3GPP2 system. In particular, steps or parts, which are not described in the embodiments of the present invention to prevent obscuring the technical spirit of the present invention, may be supported by the above documents. All terms used herein may be supported by the above-mentioned documents.

The embodiments of the present invention described below can be applied to a variety of wireless access technologies such as code division multiple access (CDMA), frequency division multiple access (FDMA), time division multiple access (TDMA), orthogonal frequency division multiple access (OFDMA), and single carrier frequency division multiple access (SC-FDMA). CDMA may be embodied through wireless technologies such as universal terrestrial radio access (UTRA) or CDMA2000. TDMA may be embodied through wireless technologies such as global system for mobile communication (GSM)/general packet radio service (GPRS)/enhanced data rates for GSM evolution (EDGE). OFDMA may be embodied through wireless technologies such as IEEE 802.11 (Wi-Fi), IEEE 802.16 (WiMAX), IEEE 802-20, and evolved UTRA (E-UTRA). UTRA is a part of universal mobile telecommunications system (UMTS). 3rd generation partnership project (3GPP) long term evolution (LTE) is a part of evolved UMTS (E-UMTS), which uses E-UTRA. 3GPP LTE employs OFDMA for downlink and employs SC-FDMA for uplink. LTE-Advanced (LTE-A) is an evolved version of 3GPP LTE. WiMAX can be explained by IEEE 802.16e (wirelessMAN-OFDMA reference system) and advanced IEEE 802.16m (wirelessMAN-OFDMA advanced system). For clarity, the following description focuses on 3GPP LTE and 3GPP LTE-A systems. However, the spirit of the present invention is not limited thereto.

LTE/LTE-A Resource Structure/Channel

Hereinafter, a radio frame structure will be described with reference to FIG. 1.

In a cellular OFDM wireless packet communication system, an uplink (UL)/downlink (DL) data packet is transmitted on a subframe basis, and one subframe is defined as a predetermined time interval including a plurality of OFDM symbols. 3GPP LTE standard supports a type-1 radio frame structure applicable to frequency division duplex (FDD) and a type-2 radio frame structure applicable to time division duplex (TDD).

FIG. 1(a) illustrates the type-1 radio frame structure. A downlink radio frame is divided into ten subframes. Each subframe includes two slots in the time domain. The time taken to transmit one subframe is defined as a transmission time interval (TTI). For example, a subframe may have a duration of 1 ms and one slot may have a duration of 0.5 ms. A slot may include a plurality of OFDM symbols in the time domain and includes a plurality of resource blocks (RBs) in the frequency domain. Since 3GPP LTE adopts OFDMA for downlink, an OFDM symbol represents one symbol period. An OFDM symbol may be referred to as an SC-FDMA symbol or a symbol period. A resource block (RB), which is a resource allocation unit, may include a plurality of consecutive subcarriers in a slot.

The number of OFDM symbols included in one slot depends on the configuration of a cyclic prefix (CP). CPs are divided into an extended CP and a normal CP. For a normal CP configuring each OFDM symbol, a slot may include 7 OFDM symbols. For an extended CP configuring each OFDM symbol, the duration of each OFDM symbol extends and thus the number of OFDM symbols included in a slot is smaller than in the case of the normal CP. For the extended CP, a slot may include, for example, 6 OFDM symbols. When a channel status is unstable as in the case of high speed movement of a UE, the extended CP may be used to reduce inter-symbol interference.

When the normal CP is used, each slot includes 7 OFDM symbols, and thus each subframe includes 14 OFDM symbols. In this case, the first two or three OFDM symbols of each subframe may be allocated to a physical downlink control channel (PDCCH) and the other three OFDM symbols may be allocated to a physical downlink shared channel (PDSCH).

FIG. 1(b) illustrates the type-2 radio frame structure. The type-2 radio frame includes two half frames, each of which has 5 subframes, a downlink pilot time slot (DwPTS), a guard period (GP), and an uplink pilot time slot (UpPTS). Each subframe includes two slots. The DwPTS is used for initial cell search, synchronization, or channel estimation in a UE, whereas the UpPTS is used for channel estimation in an eNB and UL transmission synchronization in a UE. The GP is provided to eliminate interference taking place in UL due to multipath delay of a DL signal between DL and UL. Regardless of the type of a radio frame, a subframe of the radio frame includes two slots.

Herein, the illustrated radio frame structures are merely examples, and various modifications may be made to the number of subframes included in a radio frame, the number of slots included in a subframe, or the number of symbols included in a slot.

FIG. 2 is a diagram illustrating a resource grid for one DL slot. A DL slot includes 7 OFDM symbols in the time domain and an RB includes 12 subcarriers in the frequency domain. However, embodiments of the present invention are not limited thereto. For a normal CP, a slot may include 7 OFDM symbols. For an extended CP, a slot may include 6 OFDM symbols. Each element in the resource grid is referred to as a resource element (RE). An RB includes 12 7 REs. The number NDL of RBs included in a downlink slot depends on a DL transmission bandwidth. A UL slot may have the same structure as a DL slot.

Figure 3:
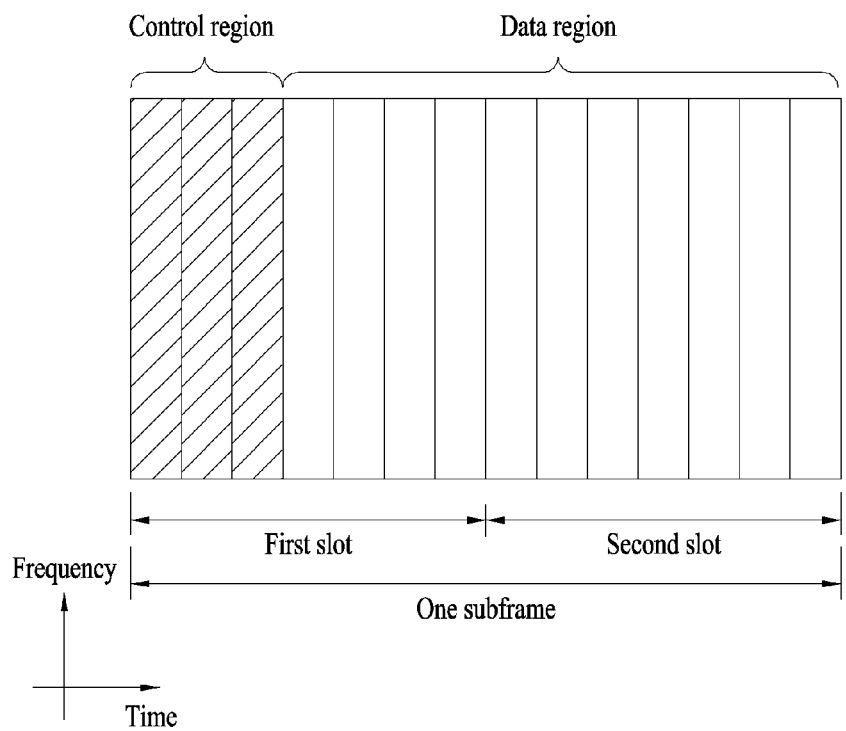
FIG. 3 illustrates a structure of a downlink subframe.

FIG. 3 illustrates a DL subframe structure. Up to the first three OFDM symbols of the first slot in a DL subframe used as a control region to which control channels are allocated and the other OFDM symbols of the DL subframe are used as a data region to which a PDSCH is allocated. DL control channels used in 3GPP LTE include, for example, a physical control format indicator channel (PCFICH), a physical downlink control channel (PDCCH), and a physical hybrid automatic repeat request (HARQ) indicator channel (PHICH). The PCFICH is transmitted at the first OFDM symbol of a subframe, carrying information about the number of OFDM symbols used for transmission of control channels in the subframe. The PHICH carries a HARQ ACK/NACK signal in response to uplink transmission. Control information carried on the PDCCH is called downlink control information (DCI). The DCI includes UL or DL scheduling information or UL transmission power control commands for UE groups. The PDCCH delivers information about resource allocation and a transport format for a DL shared channel (DL-SCH), resource allocation information about an UL shared channel (UL-SCH), paging information of a paging channel (PCH), system information on the DL-SCH, information about resource allocation for a higher-layer control message such as a random access response transmitted on the PDSCH, a set of transmission power control commands for individual UEs of a UE group, transmission power control information, and voice over internet protocol (VoIP) activation information. A plurality of PDCCHs may be transmitted in the control region. A UE may monitor a plurality of PDCCHs. A PDCCH is formed by aggregating one or more consecutive control channel elements (CCEs). A CCE is a logical allocation unit used to provide a PDCCH at a coding rate based on the state of a radio channel. A CCE corresponds to a plurality of RE groups. The format of a PDCCH and the number of available bits for the PDCCH are determined depending on the correlation between the number of CCEs and a coding rate provided by the CCEs. An eNB determines the PDCCH format according to DCI transmitted to a UE and adds a cyclic redundancy check (CRC) to the control information. The CRC is masked by an identifier (ID) known as a radio network temporary identifier (RNTI) according to the owner or usage of the PDCCH. If the PDCCH is directed to a specific UE, its CRC may be masked by a cell-RNTI (C-RNTI) of the UE. If the PDCCH is for a paging message, the CRC of the PDCCH may be masked by a paging indicator identifier (P-RNTI). If the PDCCH delivers system information, particularly, a system information block (SIB), the CRC thereof may be masked by a system information ID and a system information RNTI (SI-RNTI). To indicate that the PDCCH delivers a random access response in response to a random access preamble transmitted by a UE, the CRC thereof may be masked by a random access-RNTI (RA-RNTI).

Figure 4:
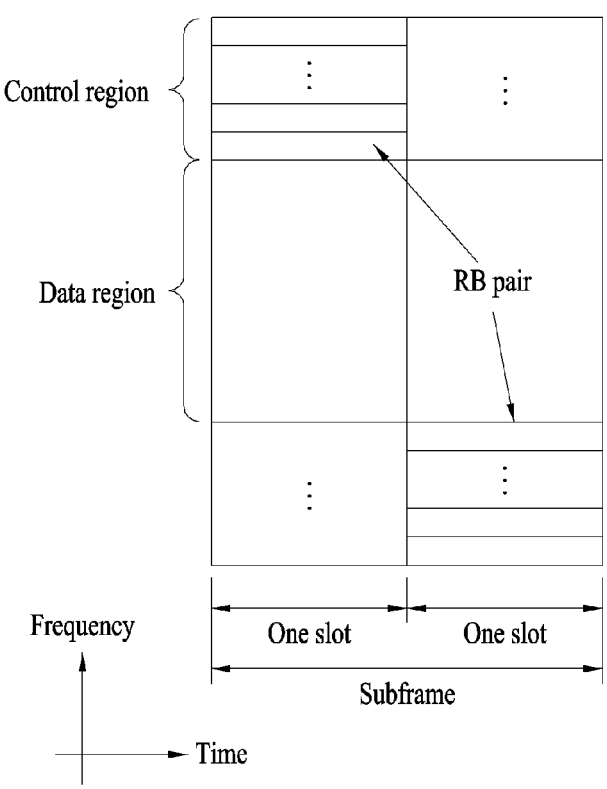
FIG. 4 illustrates a structure of an uplink subframe.

FIG. 4 illustrates a UL subframe structure. A UL subframe may be divided into a control region and a data region in the frequency domain. A physical uplink control channel (PUCCH) carrying uplink control information is allocated to the control region and a physical uplink shared channel (PUSCH) carrying user data is allocated to the data region. To maintain single carrier property, a UE does not simultaneously transmit a PUSCH and a PUCCH. A PUCCH for a UE is allocated to an RB pair in a subframe. The RBs of the RB pair occupy different subcarriers in two slots. This is often called frequency hopping of the RB pair allocated to the PUCCH over a slot boundary.

Synchronization Acquisition of D2D UE

Now, a description will be given of synchronization acquisition between UEs in D2D communication based on the foregoing description in the context of the legacy LTE/LTE-A system. In an OFDM system, if time/frequency synchronization is not acquired, the resulting Inter-Cell Interference (ICI) may make it impossible to multiplex different UEs in an OFDM signal. If each individual D2D UE acquires synchronization by transmitting and receiving a synchronization signal directly, this is inefficient. In a distributed node system such as a D2D communication system, therefore, a specific node may transmit a representative synchronization signal and the other UEs may acquire synchronization using the representative synchronization signal. In other words, some nodes (which may be an eNB, a UE, and a Synchronization Reference Node (SRN, also referred to as a synchronization source)) may transmit a D2D Synchronization Signal (D2DSS) and the remaining UEs may transmit and receive signals in synchronization with the D2DSS.

D2DSSs may include a Primary D2DSS (PD2DSS) or a Primary Sidelink Synchronization Signal (PSSS) and a Secondary D2DSS (SD2DSS) or a Secondary Sidelink Synchronization Signal (SSSS). The PD2DSS may be configured to have a similar/modified/repeated structure of a Zadoff-chu sequence of a predetermined length or a Primary Synchronization Signal (PSS), and the SD2DSS may be configured to have a similar/modified/repeated structure of an M-sequence or a Secondary Synchronization Signal (SSS). If UEs synchronize their timing with an eNB, the eNB serves as an SRN and the D2DSS is a PSS/SSS. A Physical D2D Synchronization Channel (PD2DSCH) may be a (broadcast) channel carrying basic (system) information that a UE should first obtain before D2D signal transmission and reception (e.g., D2DSS-related information, a Duplex Mode (DM), a TDD UL/DL configuration, a resource pool-related information, the type of an application related to the D2DSS, etc.). The PD2DSCH may be transmitted in the same subframe as the D2DSS or in a subframe subsequent to the frame carrying the D2DSS.

The SRN may be a node that transmits a D2DSS and a PD2DSCH. The D2DSS may be a specific sequence and the PD2DSCH may be a sequence representing specific information or a codeword produced by predetermined channel coding. The SRN may be an eNB or a specific D2D UE. In the case of partial network coverage or out of network coverage, the SRN may be a UE.

Figure 5:
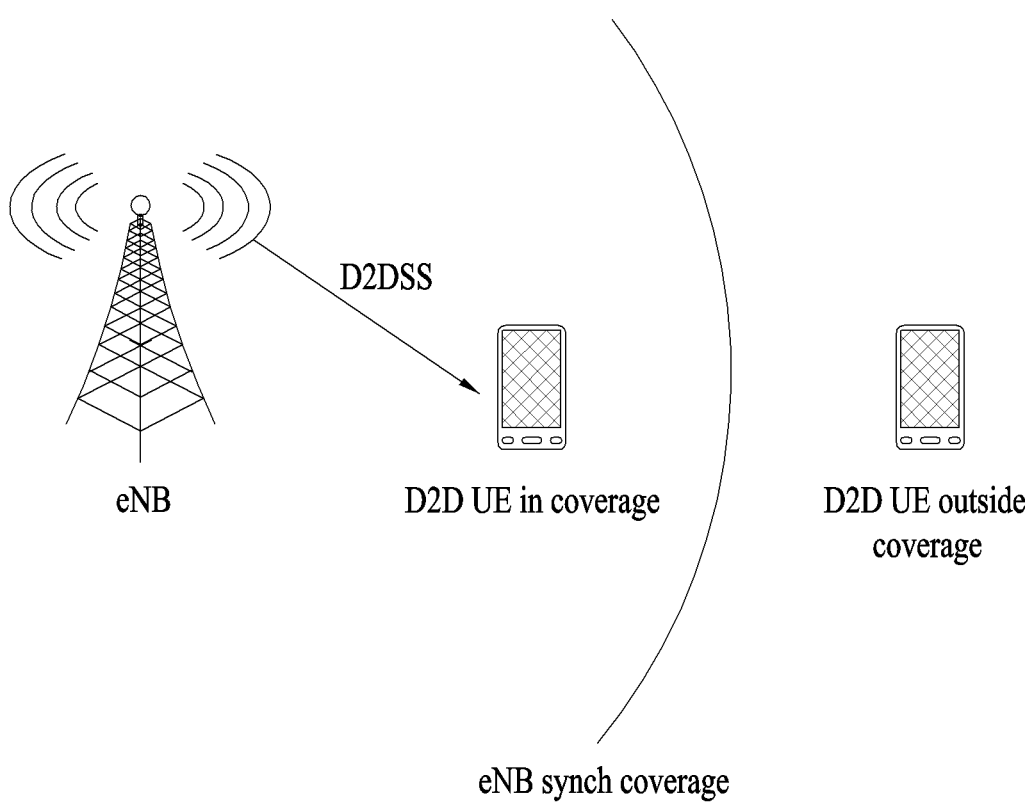
FIG. 5 illustrates relay of a synchronization signal.

In a situation illustrated in FIG. 5, a D2DSS may be relayed for D2D communication with an out-of-coverage UE. The D2DSS may be relayed over multiple hops. The following description is given with the appreciation that relay of an SS covers transmission of a D2DSS in a separate format according to a SS reception time as well as direct Amplify-and-Forward (AF)-relay of an SS transmitted by an eNB. As the D2DSS is relayed, an in-coverage UE may communicate directly with an out-of-coverage UE. FIG. 5 illustrates an exemplary case in which a D2DSS is relayed and communication is conducted between D2D UEs based on the relayed D2DSS.

A Time Resource Pattern (TRP) for use in transmitting data, a discovery signal, etc. by a UE will be described according to various embodiments of the present invention. The term 'TRP' may be interchangeably used with 'Resource Pattern for Transmission (RPT)' or 'Time-RPT (T-RPT)'. However, the terms should not be construed as limiting the scope of the present invention. Thus, it is clarified that a resource pattern having TRP properties as described below corresponds to a TRP. In the following description, a scheme for indicating the position of transmission resources by an eNB/UE is referred to as mode 1/type 2 and a scheme for indicating the position of transmission resources in a specific resource pool by a transmitting UE (by the UE's selection) is referred to as mode 2/type 1. In the following description, Scheduling Assignment (SA) may mean control information related to D2D data transmission and a channel carrying the control information. Before data transmission, an SA may first be transmitted. A receiving D2D UE may determine the position of resources carrying the data by decoding the SA and then receive a D2D signal in the resources. In the following description, D2D may be referred to as sidelink. For the convenience of description, the term 'TRP indication bit sequence' may be used. The TRP indication bit sequence may include only an ID included in an SA. If the SA includes an additional bit field indicating a TRP, the TRP indication bit sequence may be interpreted as ID+TRP bit sequence. Or a bit sequence for indicating a TRP independent of the ID may be included in the SA. In this case, the TRP bit sequence may be interpreted as the TRP indication bit sequence. A set of bit sequences used to indicate a TRP, included and transmitted in the SA may be interpreted as the TRP indication bit sequence.

TRP

Figure 6:
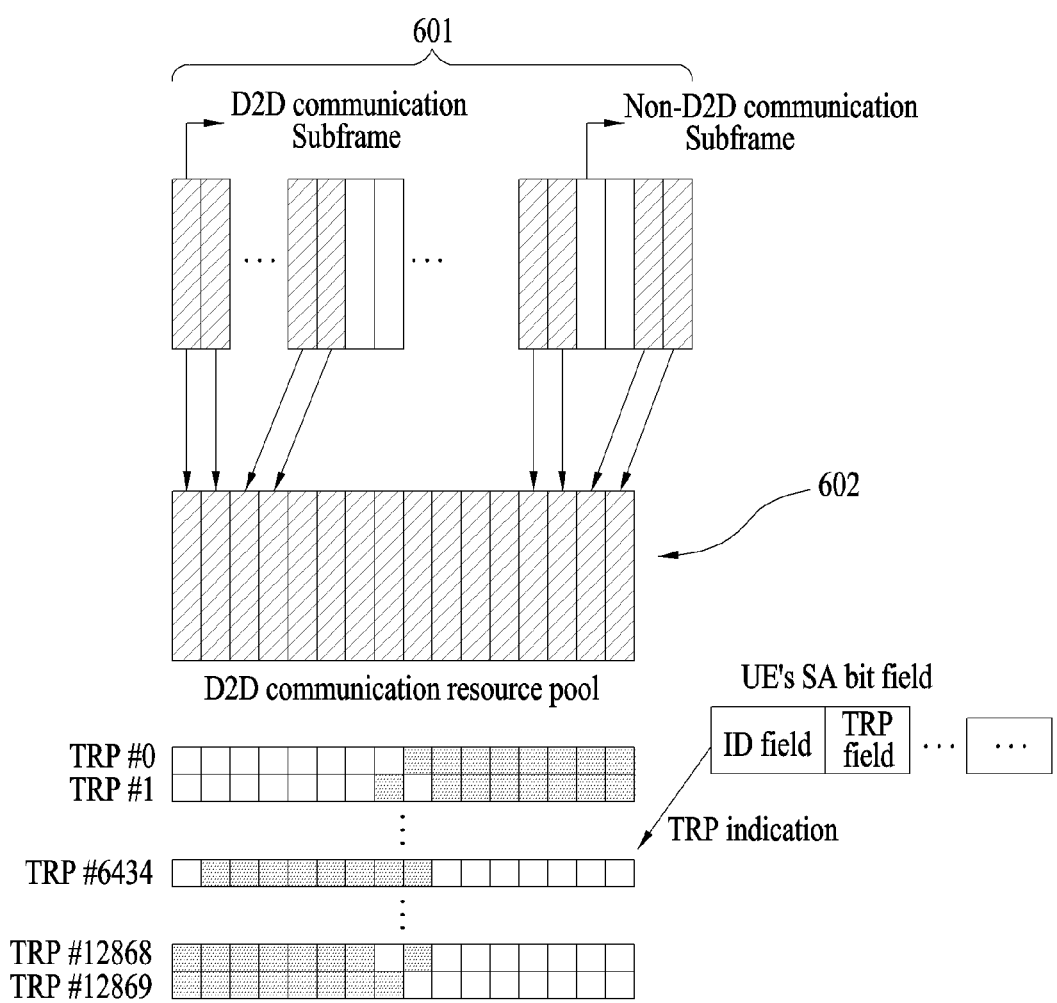
FIG. 6 illustrates a time resource pattern according to an embodiment of the present invention.

FIG. 6 illustrates TRPs according to an embodiment of the present invention. Referring to FIG. 6, a plurality of subframes 601 may include subframes available for D2D signal transmission and reception (e.g., UL subframes in TDD, and D2D communication subframes in FIG. 6) and subframes unavailable for D2D signal transmission and reception (non-D2D communication subframes in FIG. 6). The plurality of subframes 601 may be included within a D2D control information transmission period (e.g., a physical sidelink control channel). A subframe pool 602 for data transmission may be determined, which includes only D2D communication subframes from among the plurality of subframes 601.

As TRPs (TRP #0, #1, . . . ) are applied to the subframe pool 602 for data transmission, a set of subframes to transmit D2D data may be determined. For example, if TRP #1 is applied to the subframe pool 602 for data transmission, an $8^{th}$ subframe and $10^{th}$ to $16^{th}$ subframes may be included in a subframe set, for D2D data transmission. Shaded parts of the TRPs in FIG. 16 may indicate subframes that will carry D2D data. A TRP may be a bitmap having bits corresponding to the respective subframes of a subframe pool for data transmission. If a bit of the bitmap is set to 1, the bit may indicate a subframe to transmit D2D data. Specifically, if a TRP is configured to be a bitmap, the shaded parts of the TRP may be 1s and the non-shaded parts of the TRP may be 0s in FIG. 6. For example, TRP #1 is a bitmap of {0, 0, 0, 0, 0, 0, 0, 1, 0, 1, 1, 1, 1, 1, 1, 1}.

Once a subframe set is determined for transmission of D2D data, the D2D data may be transmitted in the subframe set. Upon receipt of an SA, a UE may detect and decode a D2D signal in corresponding subframes, expecting transmission of the D2D signal in the subframes.

In the above description, a Transport Block (TB) for D2D data may be transmitted in a predetermined number of subframes in a subframe set. That is, the number of repetitions/a retransmission number/the number of retransmissions may be predetermined for each TB. For example, the number of retransmissions per TB may be fixed to 4.

The above-described plurality of subframes may be contiguous subframes following D2D control information-related subframes (including UL subframes that may carry D2D control information, DL subframes with no relation to the UL subframes, and special subframes in TDD) in one D2D control information period (i.e., one SA period). The D2D control information (an SA, an MCS, resource allocation information, a TRP, etc.) may be transmitted in subframes determined to transmit D2D control information (i.e., a subframe pool (for D2D control information)) from among subframes available for transmission of D2D control information according to an SA subframe bitmap. In this case, information indicating a TRP in a subframe next to the subframe pool for D2D control information may be transmitted in the D2D control information. If one SA period is configured as described above, subframes included in a subframe pool for data transmission are not overlapped with subframes included in a subframe pool for D2D control information. More specifically, if the subframe pool for D2D control information is overlapped with the subframe pool for D2D data transmission, it may be regulated that D2D control information or D2D data is always transmitted and the D2D control information and the D2D data are not transmitted in the same subframe.

Meanwhile, the subframe pool for data transmission may not be defined separately in D2D communication mode 1. In this case, UL subframes following the subframe pool for D2D control information transmission (specifically, a subframe pool including the first subframe of a subframe bitmap for D2D control information transmission to a subframe corresponding to the last 1 of the bitmap) may be a subframe pool for implicit mode 1 D2D data transmission.

Application of TRP

In the foregoing description, a TRP may be applied to subframes as follows.

A UE may determine a subframe indicator bitmap corresponding to TRP indication information. If the UE is a D2D control information transmitter, the TRP indication information may be transmitted in D2D control information. If the UE is a D2D control information receiver, the TRP indication information may be included in received D2D control information. Herein, the TRP indication information may be described in a later-described TRP indication part or may be an index indicating a specific subframe indicator bitmap. For example, if the size of the subframe indicator bitmap is 8, there may be a set of available bitmaps. An index may be assigned to each bitmap included in the bitmap set and a subframe indicator bitmap may be determined by such as index.

A bitmap to be applied to a subframe pool for data transmission may be determined from the subframe indicator bitmap. The subframe indicator bitmap may be smaller than the subframe pool for data transmission in size. In this case, the subframe indicator bitmap (e.g., a TRP indication bit sequence) may be repeated. If the length of the TRP indication bit sequence is M, the M-bit sequence is simply repeated and filled in the remaining L subframes. If L is not a multiple of M, a TRP may be generated by sequentially filling the remaining bit sequence in the L subframes.

That is, if the subframe indicator bitmap is smaller in size than the subframe pool for data transmission, the subframe indicator bitmap may be repeated within the bitmap for the subframe pool for data transmission.

For example, if the size M of the subframe indicator bitmap is smaller than the number of subframes in the resource pool for data transmission and the UE transmits D2D data in the first subframe of the subframe pool for data transmission, the UE may transmit D2D data in a $(1+M)^{th}$ subframe of the subframe pool. Or a first bit value of the bitmap (to be applied to the subframe pool for data transmission) may be equal to a (subframe indicator bitmap size+1)$^{th}$ bit value.

If the size of the subframe pool for data transmission is not a multiple of the size of the subframe indicator bitmap, the bits of the last repeated subframe indicator bitmap may be used sequentially. In other words, if the size of the subframe pool for data transmission is not a multiple of the size of the subframe indicator bitmap, the last repeated subframe indicator bitmap may be truncated. Specifically, if the subframe indicator bitmap is 16 bits {0, 0, 0, 0, 0, 0, 0, 1, 0, 1, 1, 1, 1, 1, 1, 1} and the subframe pool includes 36 subframes, the bitmap (to be applied to a subframe pool for data transmission) is configured by repeating the subframe indicator bitmap twice and using the first 4 bits of the subframe indicator bitmap sequentially at the third repetition (while truncating the remaining bits). That is, the bitmap (to be applied to the subframe pool for data transmission) is {0, 0, 0, 0, 0, 0, 0, 1, 0, 1, 1, 1, 1, 1, 1, 1, 0, 0, 0, 0, 0, 0, 0, 1, 0, 1, 1, 1, 1, 1, 1, 1, 0, 0, 0, 0}.

Indication of TRP

Now, a description will be given of a method for indicating the above-described TRP.

First, an eNB may indicate an ID and TRP bits included and transmitted in an SA by a D2D SA grant in mode 1. The ID sequence included in the SA and/or the sequence of a TRP bit field included in the SA (a bit field indicating a specific ID and/or a TRP) may be explicitly included in the D2D SA grant. Or the ID sequence to be transmitted in the SA and/or the TRP bit field to be transmitted in the SA may be generated by hashing the bit sequence of a D2D-RNTI or using partial bits (e.g., lower N bits) of the bit sequence of the D2D-RNTI. Because an RNTI is different for each UE and at least a part of the RNTI is used, the position of D2D resources may be configured for each UE without additional signaling. A D2D-RNTI is an ID pre-signaled to distinguish D2D control information from other control information and is used for masking the CRC of the D2D control information. A part of the ID included and transmitted in the SA may be generated from the RNTI and the remaining part of the ID may be generated based on a target ID (or a group ID). Or the ID may be generated by combining (e.g., AND/XOR/OR-operating) both the RNTI and the target or group ID. The ID included and transmitted in the SA may be changed over time. Characteristically, only a Transmission (Tx) UE ID may be changed. This is because if up to a target UE ID part is hopped and a target UE is not aware of the hopping, the target UE may not detect the ID. If the target UE is aware of even a hopping pattern of the target UE ID part, every ID sequence included in the SA may be hopped in a predetermined rule. The changeability (hopping) of the ID sequence over time may be implemented by directly setting a different bit field in a D2D SA grant by the eNB and the ID sequence may be changed in a predetermined rule after the D2D SA grant of the eNB. For example, the ID sequence included in the D2D SA grant may be used as an initialization parameter for a random sequence and a time-variant sequence may be generated using a random sequence created using the initialization parameter.

Second, an ID may be transmitted in an SA and a TRP may be determined using the ID in mode 2. The ID may be a short ID induced from an ID (a transmission and/or reception (target or group) ID) by a higher layer or a bit sequence used to configure the transmission position of data and a scrambling parameter. If the ID included in the SA is too short for creation of TRP candidates, the probability of collision between IDs is increased. In this case, a plurality of Tx UEs are likely to use the same TRP. To prevent this, a part of the bits of the SA may include bits indicating a TRP. Also, a specific TRP may be indicated by combining an ID bit field and bits of a TRP field in the SA. For example, the ID included in the SA may be used to indicate a TRP set and TRP indication bits included in the SA may indicate a specific index within the TRP set. In another example, the TRP bits included in the SA may indicate a specific TRP set within a resource pool and the ID included in the SA may indicate a specific TRP within the pool/set indicated by the TRP bits. In this case, the bits indicating a TRP set may be transmitted semi-statically without being transmitted in every SA. For example, the bits indicating a TRP set may be used as a virtual CRC on the assumption that the bits are transmitted in every $n^{th}$ SA or even though the bits are transmitted in every SA, they are not changed over n SA transmissions. Meanwhile, these TRP bits are not included additionally. Rather, the TRP bits may be transmitted by borrowing an unused state of MCS bits or any other SA bit field. Or a TRP pattern may be indicated by using all unused states of additionally included bits and other bit fields.

Meanwhile, the size of TRP bits used in an indication of an SA may be changed according to the size of a D2D UE group or the number of Tx UEs in the group. For example, if a specific police officer group includes N police officers, the number of TRP indication bits is set to log 2(N). Herein, the remaining unused bits may be used for other purposes or may be set to 0s for use as a virtual CRC.

Meanwhile, an ID may be set differently for a TRP in mode 1 and mode 2. For example, while a TRP may be indicated using only a Tx UE ID in mode 1, a TRP may be indicated using both a Tx UE ID and a target UE ID (group ID) in mode 2.

To configure a TRP, the following information may be used: i) information about the size of a transmission opportunity from the viewpoint of a UE (this information indicates how many resources are allocated to one UE by one SA); and ii) information about the number of retransmissions for each TB (this information may be information about the number of TBs transmitted during one SA period. In this case, the number of retransmissions for each TB may be calculated by flooring the size (number) of transmission opportunities during one SA period/the number of TBs transmitted by one SA. Or this information may be information about the (maximum) number of repetitions for each TB). Part of the information may be preset or configured by the network. The information may be preset for an out-of-coverage UE or signaled to the out-of-coverage UE from another UE within the network by a physical-layer signal or a higher-layer signal. In addition, part of the information may be included and transmitted in an SA. For example, the transmission opportunity size may be preset or configured by the network. Herein, a retransmission number for each TB may be included and transmitted in the SA. On the other hand, information about the transmission opportunity size may be included and transmitted in the SA and information about the retransmission number may be preset or semi-statically indicated in a higher-layer signal by the network.

In a specific example, if an SA includes an 8-bit ID, the number of TRPs distinguishable by IDs is 256 (=2^8). If a mode-2 resource pool includes 16 subframes and a transmission opportunity size is 8, the number of TRPs that can be generated is 12870 (=16C8). Therefore, it is impossible to identify a TRP only by the ID bits included in the SA. To avoid this problem, additional bits may be included in the SA in order to indicate a TRP in the above-described method. In this case, about 6 additional bits are needed to distinguish all TRPs that can be produced. The additional bits may be available from a combination of unused MCS states and a new bit field or from an additional bit field.

Signaling of TRP Subset

The network may signal a TRP subset configuration by a higher-layer signal (e.g., an RRC signal). More specifically, a UE may determine a bitmap for application to a subframe pool for data transmission using TRP indication information and transmit D2D data in subframes indicated by the bitmap, as described before. In the case where an RRC Information Element (IE) related to a TRP subset is configured for the UE, if the UE is not related to the RRC IE related to a TRP subset, a set of bitmaps that can be indicated by the TRP indication information may be a subset of a bitmap set that can be indicated by the TRP indication information. Herein, the TRP indication information is an index indicating one bit map in a bitmap set.

The above description will be detailed with reference to [Table 1] below. [Table 1] defines a relationship between TRP indication information $I_{TRP}$ and a bitmap corresponding to the TRP indication information $I_{TRP}$, under the condition that the size of a TRP-related subframe indicator bitmap is 6. For example, if the TRP indication information $I_{TRP}$ is 22, the subframe indicator bitmap is {0, 1, 1, 0, 1, 0}.

TABLE 1

| $I_{TRP}$ | $k_{TRP}$ | $(b'_0, b'_1, \ldots b'_{N_{TRP}-1})$ |
|---|---|---|
| 0 | reserved | reserved |
| 1 | 1 | (1, 0, 0, 0, 0, 0) |
| 2 | 1 | (0, 1, 0, 0, 0, 0) |
| 3 | 2 | (1, 1, 0, 0, 0, 0) |
| 4 | 1 | (0, 0, 1, 0, 0, 0) |
| 5 | 2 | (1, 0, 1, 0, 0, 0) |
| 6 | 2 | (0, 1, 1, 0, 0, 0) |
| 7 | 3 | (1, 1, 1, 0, 0, 0) |
| 8 | 1 | (0, 0, 0, 1, 0, 0) |
| 9 | 2 | (1, 0, 0, 1, 0, 0) |
| 10 | 2 | (0, 1, 0, 1, 0, 0) |
| 11 | 3 | (1, 1, 0, 1, 0, 0) |
| 12 | 2 | (0, 0, 1, 1, 0, 0) |
| 13 | 3 | (1, 0, 1, 1, 0, 0) |
| 14 | 3 | (0, 1, 1, 1, 0, 0) |
| 15 | 4 | (1, 1, 1, 1, 0, 0) |
| 16 | 1 | (0, 0, 0, 0, 1, 0) |
| 17 | 2 | (1, 0, 0, 0, 1, 0) |
| 18 | 2 | (0, 1, 0, 0, 1, 0) |
| 19 | 3 | (1, 1, 0, 0, 1, 0) |
| 20 | 2 | (0, 0, 1, 0, 1, 0) |
| 21 | 3 | (1, 0, 1, 0, 1, 0) |
| 22 | 3 | (0, 1, 1, 0, 1, 0) |
| 23 | 4 | (1, 1, 1, 0, 1, 0) |
| 24 | 2 | (0, 0, 0, 1, 1, 0) |
| 25 | 3 | (1, 0, 0, 1, 1, 0) |
| 26 | 3 | (0, 1, 0, 1, 1, 0) |
| 27 | 4 | (1, 1, 0, 1, 1, 0) |
| 28 | 3 | (0, 0, 1, 1, 1, 0) |
| 29 | 4 | (1, 0, 1, 1, 1, 0) |
| 30 | 4 | (0, 1, 1, 1, 1, 0) |
| 31 | 5 | (1, 1, 1, 1, 1, 0) |
| 32 | 1 | (0, 0, 0, 0, 0, 1) |
| 33 | 2 | (1, 0, 0, 0, 0, 1) |
| 34 | 2 | (0, 1, 0, 0, 0, 1) |
| 35 | 3 | (1, 1, 0, 0, 0, 1) |
| 36 | 2 | (0, 0, 1, 0, 0, 1) |
| 37 | 3 | (1, 0, 1, 0, 0, 1) |
| 38 | 3 | (0, 1, 1, 0, 0, 1) |
| 39 | 4 | (1, 1, 1, 0, 0, 1) |
| 40 | 2 | (0, 0, 0, 1, 0, 1) |
| 41 | 3 | (1, 0, 0, 1, 0, 1) |
| 42 | 3 | (0, 1, 0, 1, 0, 1) |
| 43 | 4 | (1, 1, 0, 1, 0, 1) |
| 44 | 3 | (0, 0, 1, 1, 0, 1) |
| 45 | 4 | (1, 0, 1, 1, 0, 1) |
| 46 | 4 | (0, 1, 1, 1, 0, 1) |
| 47 | 5 | (1, 1, 1, 1, 0, 1) |
| 48 | 2 | (0, 0, 0, 0, 1, 1) |
| 49 | 3 | (1, 0, 0, 0, 1, 1) |
| 50 | 3 | (0, 1, 0, 0, 1, 1) |
| 51 | 4 | (1, 1, 0, 0, 1, 1) |
| 52 | 3 | (0, 0, 1, 0, 1, 1) |
| 53 | 4 | (1, 0, 1, 0, 1, 1) |
| 54 | 4 | (0, 1, 1, 0, 1, 1) |
| 55 | 5 | (1, 1, 1, 0, 1, 1) |
| 56 | 3 | (0, 0, 0, 1, 1, 1) |
| 57 | 4 | (1, 0, 0, 1, 1, 1) |
| 58 | 4 | (0, 1, 0, 1, 1, 1) |
| 59 | 5 | (1, 1, 0, 1, 1, 1) |
| 60 | 4 | (0, 0, 1, 1, 1, 1) |
| 61 | 5 | (1, 0, 1, 1, 1, 1) |
| 62 | 5 | (0, 1, 1, 1, 1, 1) |
| 63 | 6 | (1, 1, 1, 1, 1, 1) |
| 64-127 | reserved | reserved |

The above [Table 1] may be referred to as a mother bitmap set that is available, if there is no specific RRC signaling. In this case, an RRC IE related to a TRP subset may be configured for a UE. The RRC IE related to a TRP subset may impose a restriction on an index-based available set. For example, if $k_{TRP}$ available to the UE is 4 at maximum in [Table 1] and the TRP subset-related RRC IE is {1, 1, 1, 0}, a set of bitmaps corresponding to $k_{TRP}$ values of 1, 2, and 3 may be a subset of the mother bitmap set. That is, in the case where a TRP subset-related IE is configured by RRC signaling, if the UE is not related to the TRP set-related RRC IE (if the RRC IE is not signaled or if the RRC IE is signaled but not configured), a set of bitmaps available to the UE or a set of TRP indication information may be a subset of a set of bitmaps or TRP indication information.

The TRP subset-related RRC IE may be for a mode-2 UE.

Restricting a TRP subset by the network may be effective especially when a UE determines transmission resources as in mode 2. In the case where the UE selects a TRP index randomly, if there are a small number of neighbor UEs and thus interference is not severe, the UE may transmit a packet faster by selecting a large $k_{TRP}$ value. On the other hand, if there are a large number of neighbor UEs and thus interference is severe, the UE may be limited to a relatively small $k_{TRP}$ value through a subset to solve inband emission and half duplexing. Consequently, the specific UE may be prevented from causing severe interference continuously.

Meanwhile, although a TRP subset may be restricted by restricting $k_{TRP}$ values, it may be restricted by restricting specific TRP indexes. For example, use of a specific $I_{TRP}$ set may be signaled to a specific UE or UE group. Despite a requirement for more signaling bits than in the case of restricting a subset by signaling a $k_{TRP}$ value, this method enables more flexible TRP subset restriction. Also, this method may be used to make a UE or UE group different from a specific UE or UE group use a different subframe in the time domain. For example, a TRP subset may be configured for UE group A so that UE group A may perform transmission in all or a part of the first 4 subframes of a TRP bitmap, whereas a TRP subset may be configured for UE group B so that UE group B may perform transmission in all or a part of the last 4 subframes of the TRP bitmap.

Determination of Set of Values Available as k

A set of values available as k ($k_{TRP}$ or M1) being the number of 1s in a subframe indicator bitmap may be determined, as follows.

Embodiment 1

A set of values available as the number k of 1in a subframe indicator bitmap may vary depending on a UL/DL configuration set to which a UL/DL configuration configured for a UE belongs. In consideration of the UL/DL configurations illustrated in [Table 2] and the numbers of HARQ processes illustrated in [Table 3], the size of a subframe indicator bitmap may be 8 for UL/DL configurations 1, 2, 4, and 5, 7 for UL/DL configuration 0, and 6 for UL/DL configurations 3 and 6. This is done to allocate D2D data subframes according to the number of UL HARQ processes in TDD.

TABLE 3

| TDD UL/DL configuration | Number of HARQ processes for normal HARQ operation | Number of HARQ processes for subframe bundling operation |
|---|---|---|
| 0 | 7 | 3 |
| 1 | 4 | 2 |
| 2 | 2 | N/A |
| 3 | 3 | N/A |
| 4 | 2 | N/A |
| 5 | 1 | N/A |
| 6 | 6 | 3 |

If a set of UL/DL configurations is configured in this manner, a set of values available as k may be configured for each UL/DL configuration. For example, if one of UL/DL configurations 1, 2, 4, and 5 is configured for a UE, a set of values available as k may be {1, 2, 4, 8}. If UL/DL configuration 0 is configured for the UE, the set of values available as k may be {1, 2, 3, 4, 5, 6, 7}. If one of UL/DL configurations 3 and 6 is configured for the UE, the set of values available as k may be {1, 2, 3, 4, 5, 6} (the size of the set of values available as k may be largest in a UL/DL configuration having the most UL subframes). These configurations may be for transmission mode 1.

The reason that the value available as k is set differently according to the TDD UL/DL configuration is that the number of subframe is different according to the TDD UL/DL configuration and latency in case of using same k may be different according to the TDD UL/DL configuration. To solve this problem, it is needed to reduce available latency by using high value of k when TDD UL/DL configuration has a fewer number of UL subframe.

Embodiment 2

A set of values available as k being the number of 1s in a subframe indicator bitmap may set differently depending on modes. In other words, if a transmission mode is changed, a set of values available as k being the number of 1s in a subframe indicator bitmap may be changed even though a UL/DL configuration configured for a UE is not changed.

Specifically, if the UE operates in transmission mode 2 and one of UL/DL configurations 1, 2, 4, and 5 is configured for the UE (or the duplex mode of the UE is Frequency Division Duplex (FDD)), the set of values available as k may be {1, 2, 4}. If the UE operates in transmission mode 2 and UL/DL configuration 0 is configured for the UE, the set of values available as k may be {1, 2, 3, 4, 5}. If the UE operates in transmission mode 2 and one of UL/DL configurations 3 and 6 is configured for the UE, the set of values available as k may be {1, 2, 3, 4}. Or the set of values available as k may be smaller in transmission mode 2 than in transmission mode 1 irrespective of the UL/DL configu-

TABLE 2

| Uplink-downlink configuration | Downlink-to-Uplink Switch-point periodicity | subframe number | | | | | | | | | | # of UL subframe |
|---|---|---|---|---|---|---|---|---|---|---|---|---|
| | | 0 | 1 | 2 | 3 | 4 | 5 | 6 | 7 | 8 | 9 | |
| 0 | 5 ms | D | S | U | U | U | D | S | U | U | U | 6 |
| 1 | 5 ms | D | S | U | U | D | D | S | U | U | D | 4 |
| 2 | 5 ms | D | S | U | D | D | D | S | U | D | D | 2 |
| 3 | 10 ms | D | S | U | U | U | D | D | D | D | D | 3 |
| 4 | 10 ms | D | S | U | U | D | D | D | D | D | D | 2 |
| 5 | 10 ms | D | S | U | D | D | D | D | D | D | D | 1 |
| 6 | 5 ms | D | S | U | U | U | D | S | U | U | D | 5 | ration of the UE. Or the set of values available as k in transmission mode 2 may be a subset of the set of values available as k in transmission mode 1.

In summary, different subframe indicator bitmap sizes N and/or different k combinations may be used for mode 1 and mode 2. This is done not to use heavy k values (in other words, k values that make k/N ratios approximate to 1) intentionally in order to overcome the half duplex constraint. If a specific UE uses a heavy k values in mode 2, the other UEs may cause severe inband radiation interference in most subframe due to transmission of the specific UE. Accordingly, it is preferred to restrict the maximum value of k to or below a predetermined value in mode 2. In addition, to solve the half-duplex constraint in mode 2, it is preferred to set k to be close to a half of N in terms of maximization of the number of available combinations and solving the half-duplex constraint. For example, if N is 6, a k set includes 3.

Embodiment 3-1

A set of values available as k being the number of 1s in a subframe indicator bitmap may be configured for each duplex mode. A set of subframe indicator bitmaps (of size N) may be predefined and an entire TRP may be configured within a subframe pool by repeating a subframe indicator bitmap of length N. Herein, a set of k values (k is the number of 1s transmittable in a subframe indicator bitmap) may be predetermined Each subframe indicator bitmap of the set may be indexed and a specific index may be indicated by TRP indication bits of an SA. For example, N=8 and k={1, 2, 4, 8}. More specifically, a set of subframe indicator bitmaps may be defined for possible k values. If the size of the set is larger than the number of bits of a subframe indicator bitmap that can be indicated by an SA, some subframe indicator bitmaps may be selected. Otherwise, all possible combinations that can be produced according to (N, k) may be included in the set of subframe indicator bitmaps. For example, if an SA indicates a subframe indicator bitmap using 8 bits, it may indicate a total of 256 subframe indicator bitmaps. If one bit out of the eight bits is used to identify a set of subframe indicator bitmaps, a total of 128 subframe indicator bitmaps may be indicated by the SA. If N=8 and k={1, 2, 4, 8} as in the above example, a total of 107 (=8C1+8C2+8C4+8C8) subframe indicator bitmaps may be defined. A subframe indicator bitmap may be applied to UL subframes and only to a D2D resource pool within the UL subframes. Subframes are sparsely configured in the D2D resource pool in TDD, relative to FDD. For VoIP packets having a delay constraint, a subframe indicator bitmap needs to be designed for enabling more transmissions. In this case, a set of k values may be set differently for FDD and TDD. In TDD, allowing more transmissions is preferable in that the delay constraint is satisfied. In this context, a k set may be configured mainly using large values in TDD, relative to FDD. For example, if N=8 and k={1, 2, 4, 8} in FDD, N=8 and k={1, 4, 6, 8} in TDD. 2 in FDD is changed to 6 in TDD to thereby enable more transmissions in TDD without changing Hamming distance characteristics between TRPs.

If N=8, one of the combinations listed in [Table 4] may be selected. The combinations may be configured differently for each TDD configuration. For example, in the case of TDD configuration 5, a combination with a larger number of 1s is selected (e.g., {4, 6, 7, 8} in [Table 4]). On the other hand, if the number of UL subframes is large as in TDD configuration 0, a combination with a smaller number of 1s (e.g., {1, 4, 6, 8} in [Table 4]) is used. In other words, a set of K values in FDD are equal to or larger than a set of K values in TDD. This combination may be preset according to an FDD/TDD configuration or signaled in a physical-layer/higher-layer signal by the network irrespective of an FDD/TDD configuration.

TABLE 4

| Combination index | k set | | | | Note | Total number of subframe indicator bitmaps | Sum(k) |
|---|---|---|---|---|---|---|---|
| 0 | 1 | 2 | 4 | 8 | Same as in FDD | 107 | 15 |
| 1 | 1 | 2 | 5 | 7 | | 100 | 15 |
| 2 | 1 | 2 | 5 | 8 | | 93 | 16 |
| 3 | 1 | 2 | 6 | 7 | | 72 | 16 |
| 4 | 1 | 2 | 6 | 8 | | 65 | 17 |
| 5 | 1 | 2 | 7 | 8 | | 45 | 18 |
| 6 | 1 | 3 | 5 | 7 | | 128 | 16 |
| 7 | 1 | 3 | 5 | 8 | | 121 | 17 |
| 8 | 1 | 3 | 6 | 7 | | 100 | 17 |
| 9 | 1 | 3 | 6 | 8 | | 93 | 18 |
| 10 | 1 | 3 | 7 | 8 | | 73 | 19 |
| 11 | 1 | 4 | 6 | 7 | | 114 | 18 |
| 12 | 1 | 4 | 6 | 8 | | 107 | 19 |
| 13 | 1 | 4 | 7 | 8 | | 87 | 20 |
| 14 | 1 | 5 | 6 | 7 | | 100 | 19 |
| 15 | 1 | 5 | 6 | 8 | | 93 | 20 |
| 16 | 1 | 5 | 7 | 8 | | 73 | 21 |
| 17 | 1 | 6 | 7 | 8 | | 45 | 22 |
| 18 | 2 | 3 | 6 | 7 | | 120 | 18 |
| 19 | 2 | 3 | 6 | 8 | | 113 | 19 |
| 20 | 2 | 3 | 7 | 8 | | 93 | 20 |
| 21 | 2 | 4 | 6 | 8 | | 127 | 20 |
| 22 | 2 | 4 | 7 | 8 | | 107 | 21 |
| 23 | 2 | 5 | 6 | 7 | | 120 | 20 |
| 24 | 2 | 5 | 6 | 8 | | 113 | 21 |
| 25 | 2 | 5 | 7 | 8 | | 93 | 22 |
| 26 | 2 | 6 | 7 | 8 | | 65 | 23 |
| 27 | 3 | 5 | 7 | 8 | | 121 | 23 |
| 28 | 3 | 6 | 7 | 8 | | 93 | 24 |
| 29 | 4 | 6 | 7 | 8 | | 107 | 25 |
| 30 | 5 | 6 | 7 | 8 | | 93 | 26 |

Embodiment 3-2

A set of values available as k may not include a specific k value depending on TDD or FDD. For example, a k value of 1 may not be used in TDD configuration 5. If for N=8, k=1 and the number of transmissions is 1 for each MAC PDU, a delay of at least 320 ms is required, exceeding a 200-ms delay budget. If k=2, a 160-ms delay occurs, satisfying the 200-ms delay budget. The same principle may be applied to other cases. For example, if a specific k value does not satisfy a VoIP delay constraint in a specific TDD configuration, a UE may select a subframe indicator bitmap from among the remaining k values except for the k value. More generally, if the UE transmits a VoIP packet (or a (video) packet having a different delay constraint), it may be regulated that the UE does not use a subframe indicator bitmap that does not satisfy the delay constraint. For the convenience of description, a set of subframe indicator bitmaps that satisfy a delay constraint may be referred to as a set of valid subframe indicator bitmaps. For example, it is assumed that a bitmap size of a resource pool is 4 and the length of a subframe indicator bitmap is 8 in TDD configuration 5. Since the length of the resource pool is not equal to the length of the subframe indicator bitmap, the last 4 bits of the subframe indication bit may be truncated. If only the first 4 bits of the subframe indicator bitmap are used, even though the UE selects a large k value, 1s are located at the last positions. Therefore, the UE may have no transmission opportunity in the first 4 bits. For example, if the UE selects 00001111, the UE may have no transmission opportunity in the above configuration. In this case, the VoIP delay constraint may be satisfied only when at least one 1 is present in the first four bits of the subframe indicator bitmap. Therefore, it may be regulated that subframe indicator bitmap, the subframe indicator bitmap may be a valid subframe indicator bitmap only when the subframe indicator bitmap has at least one 1 in the first 4 bits and that the UE selects a subframe indicator bitmap from a set of valid subframe indicator bitmaps.

To assign more transmission opportunities in TDD than in FDD, an N-k combination having a larger k/N value may be used. For example, if N is 8 and a maximum k set is {1, 2, 4, 8} in FDD, N=7 and k={1, 3, 5, 7} in TDD. A comparison between FDD and TDD in terms of k/N values reveals that TDD uses larger k/N values, {0.1429, 0.4286, 0.7143, 1.0000} than k/N={0.125, 0.25, 0.5, 1} in FDD. This means that more transmission opportunities are available in TDD. In summary, since UL subframes are more sparse in TDD than in FDD, a higher k value or a higher k/N value may be used in TDD than in FDD.

[Table 5] and [Table 6] illustrate exemplary sets of values available as k based on the above descriptions.

TABLE 5

| For mode 1 and/or mode 2 | N | k | Total number of T-TRP |
|---|---|---|---|
| TDD configuration 1, 2, 4, 5 | 8 | {2, 4, 6, 8} or {1, 2, 4, 8} | 127 or 107 |
| TDD configuration 0 | 7 | {2, 4, 6, 7} or {2, 3, 4, 7} or {1, 2, 4, 7} or {1, 2, 3, 4, 5, 6, 7} | 64 or 92 or 64 or 127 |
| TDD configuration 3, 6 | 6 | {2, 4, 6} or {2, 3, 4, 6} or {1, 2, 3, 6} or {1, 2, 4, 6} or {1, 2, 3, 4, 5, 6} | 31 or 51 or 42 or 37 or 63 |

TABLE 6

| For mode 2 | N | k | Total number of T-TRP |
|---|---|---|---|
| TDD configuration 1, 2, 4, 5 | 8 | {1, 2, 4} or {2, 4} or {2, 4, 6} or {3, 4} | 106 or 98 or 126 or 126 |
| TDD configuration 0 | 7 | {2, 3, 4} or {2, 4, 6} or {1, 2, 4} or {1, 2, 3, 4}, {1, 2, 3, 4, 5}, {1, 2, 3, 4, 5, 6} | 91 or 63 or 63 or 98 or 119 or 126 |
| TDD configuration 3, 6 | 6 | {2, 4} or {1, 2, 3} or {2, 3, 4} or {1, 2, 4} or {1, 2, 3, 4}, {1, 2, 3, 4, 5} | 30 or 41 or 50 or 36 or 56 or 62 |

To describe [Table 5] and [Table 6] in greater detail, k is set in mode 1 in such a manner that more transmission opportunities and more available combinations may be given in TDD than in FDD. To overcome the half-duplex constraint, k equal to or close to a half weight (N/2) is included in mode 2. For example, since N is an odd number, 7 in TDD configuration 0, a k value of 3 or 4 may be included.

Meanwhile, if the number of bits that can be indicated by a T-TRP in an SA is limited, a set of k values is preferably set so that all of combinations that can be represented by the T-TRP bits in the SA may be used if possible. Particularly, as more patterns are used in D2D resource allocation, interference randomization between UEs increases and thus performance is improved. For example, if the number of bits that may indicate a TRP in an SA is 7, a total of 128 TRPs may be distinguished and 128 sets of k values may all be used. Thus, the resulting increase in the interference randomization effect may lead to improved performance.

Configurations of Apparatuses According to Embodiment of the Present Invention

Figure 7:
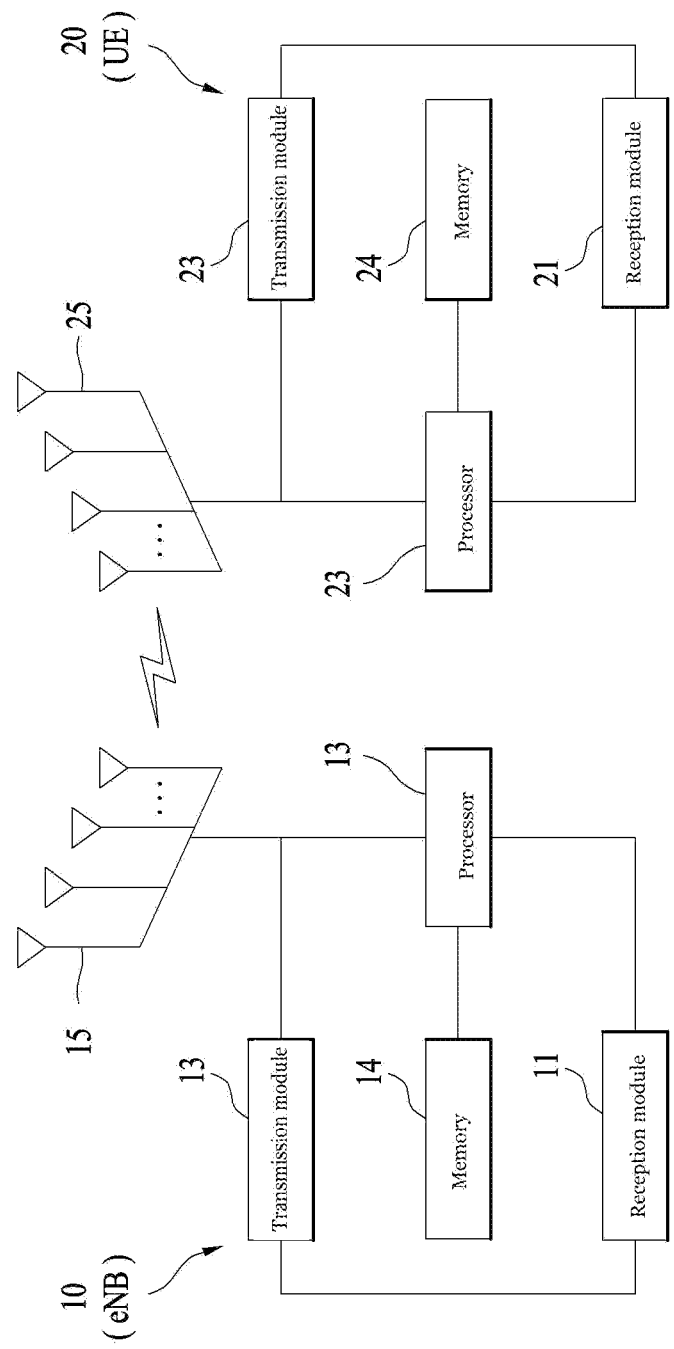
FIG. 7 is a block diagram of a transmission apparatus and a reception apparatus.

FIG. 7 is a block diagram of a transmission point and a UE according to an embodiment of the present invention.

Referring to FIG. 7, a transmission point 10 according to the present invention may include a Reception (Rx) module 11, a Tx module 12, a processor 13, a memory 14, and a plurality of antennas 15. Use of the plurality of antennas 15 means that the transmission point 10 supports MIMO transmission and reception. The reception module 11 may receive UL signals, data, and information from a UE. The Tx module 12 may transmit DL signals, data, and information to a UE. The processor 13 may provide overall control to the transmission point 10.

The processor 13 of the transmission point 10 according to the embodiment of the present invention may perform necessary operations in the afore-described embodiments.

Besides, the processor 13 of the transmission point 10 processes received information and information to be transmitted to the outside of the transmission point 10. The memory 14 may store the processed information for a predetermined time and may be replaced with a component such as a buffer (not shown).

Referring to FIG. 7 again, a UE 20 according to the present invention may include an Rx module 21, a Tx module 22, a processor 23, a memory 24, and a plurality of antennas 25. Use of the plurality of antennas 25 means that the UE 20 supports MIMO transmission and reception using the plurality of antennas 25. The Rx module 21 may receive DL signals, data, and information from an eNB. The Tx module 22 may transmit UL signals, data, and information to an eNB. The processor 23 may provide overall control to the UE 20.

The processor 23 of the UE 20 according to the embodiment of the present invention may perform necessary operations in the afore-described embodiments.

Besides, the processor 23 of the UE 20 processes received information and information to be transmitted to the outside of the UE 20. The memory 24 may store the processed information for a predetermined time and may be replaced with a component such as a buffer (not shown).

The above transmission point and UE may be configured in such a manner that the above-described various embodiments of the present invention may be implemented independently or in combination of two or more. A redundant description is omitted for clarity.

The description of the transmission point 10 in FIG. 7 is applicable to a relay as a DL transmitter or a UL receiver, and the description of the UE 20 in FIG. 7 is applicable to a relay as a DL receiver or a UL transmitter.

As is apparent from the foregoing description, a delay and a half duplex problem that should be considered in using a time resource pattern can be solved according to an embodiment of the present invention.

The embodiments of the present invention may be implemented by various means, for example, in hardware, firmware, software, or a combination thereof.

In a hardware configuration, the method according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention are applicable to various mobile communication systems.

What is claimed is:

1. A method for transmitting Device-to-Device (D2D) data by a User Equipment (UE) in a wireless communication system, the method comprising:
   determining a bitmap to be applied to a subframe pool for data transmission from a subframe indicator bitmap;
   determining a set of suframes to transmit the D2D data by using the bitmap to the subframe pool for data transmission; and
   transmitting the D2D data in a subframe included in the determined subframe set,
   wherein a set of values available as k being the number of 1s in the subframe indicator bitmap are determined according to a Uplink/Downlink (UL/DL) configuration set to which a UL/DL configuration configured for the UE belongs,
   wherein the UL/DL configuration sets comprise UL/DL configuration 1, 2, 4 and 5, UL/DL configuration 0 and UL/DL configurations 3 and 6, and
   wherein a value of 1 in the subframe indicator bitmap indicates the subframe used to transmit the D2D data.

2. The method according to claim 1, wherein if the UL/DL configuration configured for the UE is one of UL/DL configurations 1, 2, 4 and 5, the set of values available as k is $\{1, 2, 4, 8\}$.

3. The method according to claim 1, wherein if the UL/DL configuration configured for the UE is UL/DL configuration 0, the set of values available as k is $\{1, 2, 3, 4, 5, 6, 7\}$.

4. The method according to claim 1, wherein if the UL/DL configuration configured for the UE is one of UL/DL configurations 3 and 6, the set of values available as k is $\{1, 2, 3, 4, 5, 6\}$.

5. The method according to claim 1, wherein the D2D data transmission is for transmission mode 1.

6. The method according to claim 1, wherein if the set of values available as k is $\{1, 2, 4, 8\}$, $\{1, 2, 3, 4, 5, 6, 7\}$, or $\{1, 2, 3, 4, 5, 6\}$, the size of the subframe indicator bitmap is 8, 7, or 6, respectively.

7. An apparatus of a User Equipment (UE) for transmitting Device-to-Device (D2D) data in a wireless communication system, the apparatus comprising:
   a transmission module; and
   a processor,
   wherein the processor is configured to
      determine a bitmap to be applied to a subframe pool for data transmission from a subframe indicator bitmap,
      determine a set of suframes to transmit the D2D data by using the bitmap to the subframe pool for data transmission, and
      transmit the D2D data in a subframe included in the determined subframe set,
   wherein a set of values available as k being the number of 1s in the subframe indicator bitmap are determined according to a Uplink/Downlink (UL/DL) configuration set to which a UL/DL configuration configured for the UE belongs,
   wherein the UL/DL configuration sets comprise UL/DL configuration 1, 2, 4 and 5, UL/DL configuration 0 and UL/DL configurations 3 and 6, and
   wherein a value of 1 in the subframe indicator bitmap indicates the subframe used to transmit the D2D data.

8. The apparatus according to claim 7, wherein if the UL/DL configuration configured for the UE is one of UL/DL configurations 1, 2, 4 and 5, the set of values available as k is $\{1, 2, 4, 8\}$.

9. The apparatus according to claim 7, wherein if the UL/DL configuration configured for the UE is UL/DL configuration 0, the set of values available as k is $\{1, 2, 3, 4, 5, 6, 7\}$.

10. The apparatus according to claim 7, wherein if the UL/DL configuration configured for the UE is one of UL/DL configurations 3 and 6, the set of values available as k is $\{1, 2, 3, 4, 5, 6\}$.

11. The apparatus according to claim 7, wherein the D2D data transmission is for transmission mode 1.

12. The apparatus according to claim 7, wherein if the set of values available as k is $\{1, 2, 4, 8\}$, $\{1, 2, 3, 4, 5, 6, 7\}$, or $\{1, 2, 3, 4, 5, 6\}$, the size of the subframe indicator bitmap is 8, 7, or 6, respectively.

* * * * *